July 20, 1948.   P. F. McDERMOTT ET AL   2,445,624
METHOD OF MAKING TUBULAR COVERINGS
Filed Nov. 11, 1943   2 Sheets-Sheet 1
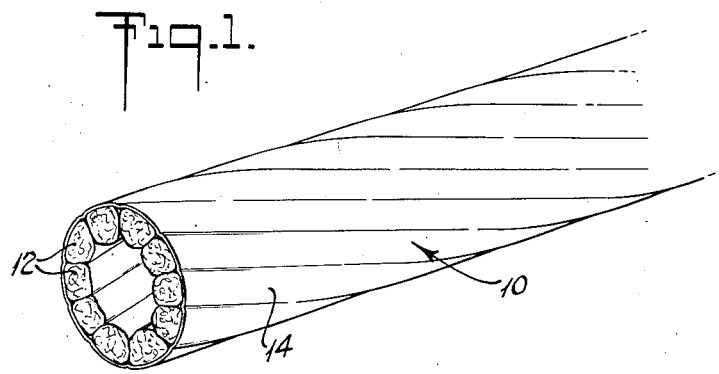
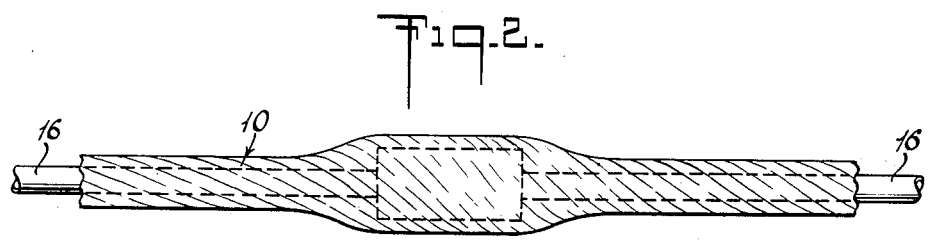
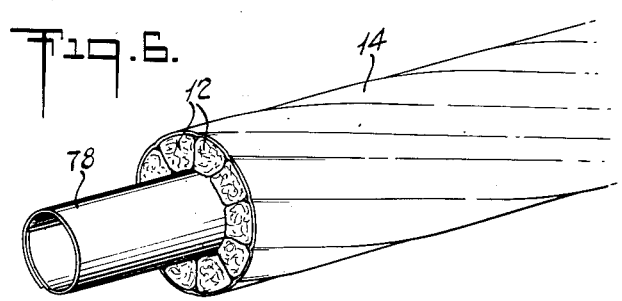
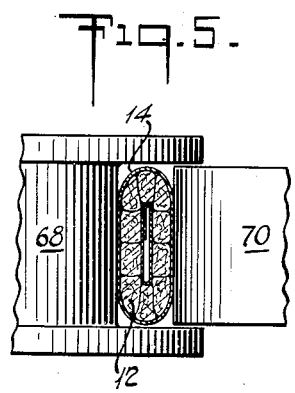
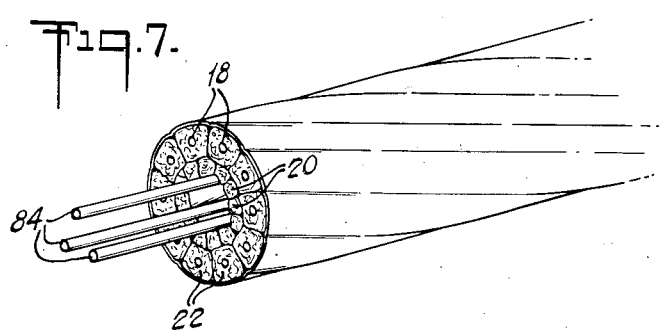
INVENTORS
PAUL F. McDERMOTT.
HARRY E. HOLCOMB.
BY
ATTORNEY July 20, 1948.    P. F. McDERMOTT ET AL    2,445,624
METHOD OF MAKING TUBULAR COVERINGS
Filed Nov. 11, 1943    2 Sheets-Sheet 2
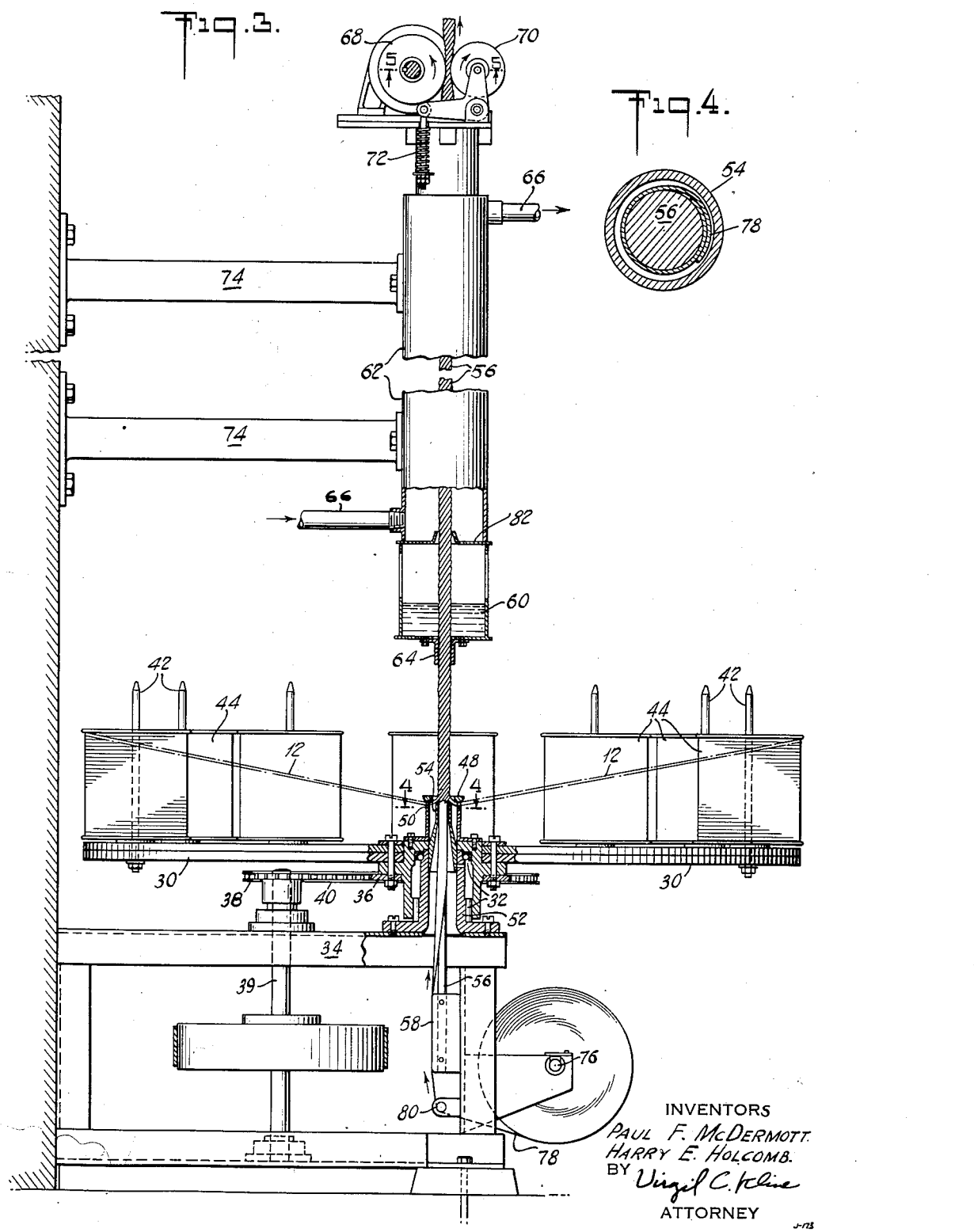
INVENTORS
PAUL F. McDERMOTT.
HARRY E. HOLCOMB.
BY Virgil C. Kline
ATTORNEY Patented July 20, 1948

2,445,624

UNITED STATES PATENT OFFICE 2,445,624

METHOD OF MAKING TUBULAR COVERINGS

Paul F. McDermott, Martinsville, N. J., and Harry E. Holcomb, Stratford, Conn., assignors to Johns-Manville Corporation, New York, N. Y., a corporation of New York Application November 11, 1943, Serial No. 509,880

7 Claims. (Cl. 154—83)

The present invention relates to insulating coverings for tubes, pipes and the like, and more particularly, to seamless tubular coverings for such purposes.

Heretofore in the insulation of tubes, small pipes and assemblies thereof, such as employed for example for certain aircraft fluid lines, it has been conventional to wrap an insulating tape, such as an asbestos tape, spirally over the line and the line fittings. The application of the insulating material by such operations is necessarily slow and laborious. Furthermore, it is difficult to obtain and maintain that degree of tightness between adjacent spirals of the tape required to insure uniform coverage over the entire area of the tube or line. A principal object of the invention is the provision of a method of making seamless tubular pipe covering which may be drawn endwise over lines of considerable length, eliminating the necessity of spirally wrapping the covering material directly on the line. In a preferred embodiment the covering is of a character to yield to conform to fittings and sections of varying diameters.

A more specific object of the invention in the preferred embodiment thereof, is the provision of a method of making a tubular insulating covering, the covering being flexible and pliable and capable of being readily stretched to fit enlarged or contracted sections of the line.

Another object of the invention is the provision of a method of making a tubular, seamless covering, comprising spiral windings of asbestos listing, roving or other strand-like material, the windings being secured in contiguous relationship into a unitary, integrated body by an adhesive material.

A further object of the invention in the preferred embodiment thereof is the provision of a method of making a tubular covering as referred to in which the adhesive material is of a flexible, extensible character.

A further and important object of the invention is the provision of a method of making a tubular covering composed of spiralled strands, the method involving the assembly of the strands into a loosely integrated tube, and the maintenance of such relationship of the strands during the steps required to secure the strands into the final fully integrated structure.

A still further object of the invention is the provision of such method involving the use of a removable carrier element for temporary support of the spiralled strands during the tube forming and integrating steps.

Our invention will be more fully understood, and further objects and advantages thereof will become apparent when reference is made to the more detailed description which is to follow, and to the accompanying drawings in which:

Fig. 1 is a perspective view of a tubular covering in accordance with the invention;

Fig. 2 is an elevational view illustrating the application of the tubular covering to a small diameter pipe line or the like;

Fig. 3 is a view, partly in section and partly in elevation, disclosing an apparatus employed for the carrying out of the invention;

Fig. 4 is a sectional view on an enlarged scale, taken on the line 4—4 of Fig. 3;

Fig. 5 is a sectional view on an enlarged scale taken on the line 5—5 of Fig. 3;

Fig. 6 is a perspective view illustrating a tubular covering of the invention in a certain stage of the manufacture thereof; and Fig. 7 is a view similar to Fig. 6 illustrating certain modifications of the invention.

Referring now to the drawings, and more particularly to Figs. 1 and 2, there is shown a seamless tubular covering 10 preferably for small pipe lines and the like or other equipment to be insulated or covered. However the covering is adapted for use on members of relatively larger diameter if desired. The covering, in the preferred embodiment of the invention, is made up of a plurality of strands 12, lying in parallel, contiguous spirals to form a hollow tubular structure, and an adhesive material 14 securing the strands together and maintaining them in assembled relationship.

The individual strands may be of any suitable type, and preferably are composed of asbestos fibers, with or without the addition of other fibers, reinforcing threads and the like, in the form of ropes, rovings, wicking, listings and the like and are of a diameter determined by the thickness desired for the walls of the covering. The number of individual strands making up the covering may be varied as desired, to adjust the slope or pitch of the spirals, and thereby vary the relative longitudinal and circumferential yieldability of the covering, as will be hereinafter more fully pointed out. The adhesive which may be present either as a strand impregnant or as a coating on the assembly, preferably the latter, may vary from a material which, when set or dried, is relatively unyieldable and rigid, to one which is yieldable and extensible, depending upon the particular use to which the covering is to be put. In the preferred embodiment of the invention, the adhesive is applied as a coating after assembly of the strands into tubular form, and is of a yieldable, extensible character which will permit the tubes to be stretched, both circumferentially and longitudinally.

As pointed out above, one use of the invention of special importance is in covering relatively small diameter oil lines and the like, such lines being of considerable length and ofttimes including portions of enlarged or reduced diameter. A line of this character is shown diagrammatically at 16 in Fig. 2. The tubular covering 10 having a flexible, extensible adhesive coating as referred to, may be readily applied by forcing it endwise on to the line. Due to the fact that the covering is formed solely of spiral windings and a yieldable coating, its diameter may be varied as necessary to conform to enlarged portions or fittings, change in diameter causing a related change in the pitch of the spiral windings. As will be appreciated increase in diameter of the covering is caused by endwise compression while the diameter is reduced by endwise stretching. In applying the covering to a line as illustrated in Fig. 2, forcing of the covering on to the enlarged portion causes the covering to expand in diameter. After the complete section is applied endwise stretching causes diameter reduction until the covering closely embraces the line in all portions. The covering may be supplied of slightly oversized diameter so that it is very easily applied to relatively long lengths of the line, and then by longitudinal stretching, brought into close fitting contact throughout. The relative circumferential and longitudinal stretch characteristics are primarily dependent upon the pitch of the spirals which, in turn, depends upon the number and size of individual strands employed for a given diameter.

For purposes of example and without limiting the invention, it may be stated that a covering particularly suitable for the purposes referred to above, has been made of from 1 to 18 strands of asbestos wicking, each approximately ¼ inch in diameter for a nominally ¾ inch inner diameter tubular covering, and 1–22 strands and 1–30 strands have been employed, respectively, for nominally 1 inch and 1½ inch coverings.

Suitable adhesive coatings or impregnants are bitumens, rubbers, glues, vinyl resins, sodium silicate, natural or synthetic gums, natural or synthetic resins and other glues or pastes, the particular adhesive material as previously explained, depending upon the desired properties of the completed covering. For the yieldable, extensible covering referred to above a vinyl resin has been found to be a very acceptable material. The adhesive is preferably applied in the form of a coating to the exterior of the strands but, as has been indicated, the individual strands may be previously impregnated with the adhesive in an unset condition, and the adhesive set after assembly of the strands. Also, combinations of impregnation and coating may be employed.

If desired, the individual strands may be reinforced as, for example, by an inserted, reinforcing core or element 18, as indicated in Fig. 7. Also a plurality of layers 20 and 22 of strands of the same or different diameters may be used as also indicated in Fig. 7. In the event an adhesive or coating is used which is relatively rigid or hard when set, the tube may be bent to various shapes before setting of the adhesive to secure a molded product.

In the manufacture of tubular covering, as described above, in accordance with the method of the invention, an apparatus is preferably employed as disclosed diagrammatically in Figs. 3 to 5 inclusive. The apparatus includes a turntable 30, mounted for rotation upon suitable bearings indicated generally at 32, carried by a support 34. The platform 30 is rotated, for example, by a drive including a ring gear 36, carried by the platform, and a gear 38 supported on a shaft 39. Gears 36 and 38 are connected by a drive chain 40 or the like. Shaft 39 is driven from a suitable source of power, such as an electric motor (not shown). Platform 30 is provided with spindles 42, adapted to hold spools 44 of the strand material 12, making up the tubular covering. Secured to the platform to rotate therewith is a collar 48 having guide eyes 50, one for each of the spindles, through which the strands lead from their respective spools. As many of the spindles and guides are provided as is necessary to accommodate the greatest number of strands to be employed.

Supported on an upstanding portion 52 of the fixed base, is a former or guide 54, the function of which will be later described. A mandrel 56 is supported on the base as by a bracket 58, the mandrel extending upwardly through former 54 and collar 48, into a coating applying device 60 and a coating drier or setting means 62. The mandrel is of a diameter approximately equal to the desired internal diameter of the covering.

Coating device 60 in a preferred form comprises a cup-like member provided with a central aperture in its lower wall through which the mandrel extends, the aperture being surrounded by a sealing lip 64 of any desired construction. The setting chamber 62 may be of any particular construction required to set or dry the coating material employed. As shown, chamber 62 is in the form of an extending tube surrounding the upper end of the mandrel, having inlet and outlet ports 66 through which a setting medium such as steam, hot air or the like may be circulated to completely, or substantially completely set the coating before the tubing leaves the upper end of the chamber. Mounted above chamber 62 is a take-off device which may be of any desired construction and which, as shown, comprises pinch rolls 68 and 70, spring pressed toward each other as by mechanism 72, one of the pinch rolls, for example roll 68, being driven by any suitable drive mechanism, in timed relationship to the rotation of platform 30. The coating means 60, chamber 62 and take-off device may be supported as, for example, by brackets 74.

Below the turntable is a spindle 76, adapted to support a roll or coil of material used as a carrier element to support and carry the assembled strands through the apparatus prior to complete setting of the coating. In the preferred embodiment, the carrier element comprises a flat tape 78 of sufficient width to be wrapped around the mandrel 56. The tape is adapted to be drawn from the supply spindle 76 around a guide roll 80, and upwardly through former 54 by which it is wrapped around mandrel 56.

In the carrying out of the method, the carrier element 78 is drawn from the supply, threaded upwardly through the former 54, coating device 60, setting chamber 62 and between pinch rolls 68 and 70, by which it is grasped and drawn continuously forwardly when the machine is operated. The carrier is wrapped around the mandrel by the former 54 as illustrated in Fig. 4.

Spools of the selected strand material are mounted on spindles 42 in the number desired, depending upon strand size and pitch of the strand spirals. Each strand end is threaded through its corresponding eye 50 and wrapped or otherwise initially fastened around the mandrel 56 and the carrier element. The selected coating material is supplied to coating chamber 60 and the steam, hot air or other selected setting agent is circulated through setting chamber 62. The coating, if thermoplastic, may be supplied in a heated liquid condition, or may be liquified by a suitable solvent or may be applied in powder form. Selected plasticizers and modifiers may be included in the coating material.

The machine is started up and upon rotation of platform 30, the several strands are wrapped in spirals around mandrel 56 and the carrier element, the spiralled material being moved forwardly or upwardly continuously with its formation on the carrier element by the take-off device. The rate of upward movement of the carrier is controlled relatively to the speed of rotation of platform 30 so that successive spirals lie in parallel contiguous relationship.

As the loosely integrated tube of spiralled strands passes through coating chamber 60, the coating material is applied thereto. The thickness of the coating may be controlled, as for example, by doctor blades 82. The coating material takes its permanent set in the setting chamber to bind the spiralled strands into a fully integrated structure. The mandrel may terminate in or prior to the setting chamber the covering being drawn off the mandrel end by the take-off device.

The carrier element performs the primary function of carrying and supporting the covering from the point of its formation until it leaves the pinch rolls. The carrier element is, in turn supported by the mandrel during the tube forming operations. As illustrated in Fig. 5, after sufficient of the covering has been made to reach the take-off device, the carrier element continues to perform its carrying and supporting function, it being pinched or grasped by the rolls 68 and 70 acting through the walls of the covering. As will be understood, in the absence of the carrier element, the covering could not be drawn through the apparatus as before setting of the coating the spiralled strands would separate and after the coating is set the tube would stretch.

The carrier element 78 in effect forms an inner relatively non-extensible liner, for the otherwise extensible tube and may be removed at any time after completion of the tube, by pulling it lengthwise from the covering.

In lieu of strip material for the carrier element, wires, strands or the like such as illustrated at 84 in Fig. 7, may be used. Furthermore, in place of a carrier requiring endwise removal from the tube, the carrier element may be made of a material, for example, a regenerated cellulose, plastic or the like, subject to disintegration when subjected to relatively elevated temperatures or to a solvent. In this case extensibility is restored to the covering by elimination of the non-extensible characteristics of the carrier. It will be appreciated that where a thermoplastic material is employed for the carrier it should have such characteristics that it will not materially soften or disintegrate under the temperatures employed in the setting chamber.

Having thus described our invention in rather full detail, it will be understood that these details need not be strictly adhered to and that various changes and modifications may suggest themselves to one skilled in the art, all falling within the scope of the invention as defined by the subjoined claims.

What we claim is:

1. In a method of making a tubular covering, the steps comprising, applying a relatively non-extensible carrier element to a mandrel, winding a plurality of strands in parallel, contiguous spirals around the carrier element and mandrel to form a tube extending lengthwise thereof, drawing the tube away from the winding operation without disruption of the contiguous relationship of the spirals by moving the carrier element along the mandrel, coating the outer face of the tube with an adhesive material, setting the adhesive material, and removing the carrier element.

2. In a continuous method of making a tubular covering, the steps comprising continuously supplying a relatively non-extensible carrier element to extend lengthwise of a mandrel, winding a plurality of strands in parallel, non-adhered, contiguous spirals around the mandrel and carrier element to form a loosely integrated tube, drawing said tube away from the winding operation without disruption of the contiguous relationship of the spirals or the stretching of the tube by moving said carrier element and, during such movement, applying a flexible, stretchable adhesive to the outer wall of said tube, and setting said adhesive to secure the spiral strands of the tube in integrated relationship.

3. In a continuous method of making a tubular covering, the steps comprising continuously supplying a relatively non-extensible carrier element to extend lengthwise of a mandrel, winding a plurality of strands in parallel, contiguous spirals around the mandrel and carrier element to form a loosely integrated tube, drawing said tube away from the winding operation without disruption of the contiguous relationship of the spirals or stretching of the tube by moving said carrier element, and during such movement, applying a flexible, stretchable adhesive to the outer wall of said tube, setting said adhesive to secure the spiral strands thereof in integrated relationship, and removing said carrier element.

4. In a method of making a tubular covering, the steps comprising, continuously advancing a relatively non-extensible carrier element from a supply thereof, applying the carrier element to a mandrel, wrapping a plurality of strands in parallel, non-adhered, contiguous spirals around the mandrel and carrier element to form a loosely integrated tube, conveying the tube away from the wrapping operation without disrupting the contiguous relationship of the spirals by moving said carrier element, securing the spirals together to form a fully integrated tube, and removing the carrier element.

5. In a method of making a tubular covering, the steps comprising, advancing a carrier element comprising a relatively non-extensible strip material from a supply thereof, applying the carrier element around a mandrel continuously with its advancement, wrapping a plurality of strands in parallel non-adhered, contiguous spirals around the mandrel and carrier element during advancement of the latter to form a loosely integrated assembly, drawing the assembly away from the wrapping operation without disruption of the contiguous relationship of the spirals by continuous advancement of the carrier element, securing the spirals together to form a fully integrated structure, and removing the carrier element.

6. In a method of making a tubular covering, the steps comprising, advancing a carrier element comprising a relatively non-extensible strip material from a supply thereof, applying the carrier element around a mandrel continuously with its advancement, wrapping a plurality of strands in parallel, contiguous relationship around the mandrel and carrier element during advancement of the latter to form a loosely integrated tube, drawing the tube away from the wrapping operation without disruption of the contiguous relationship of the spirals by continued movement of the carrier element, continuing the forward movement of the carrier element to draw the tube through an adhesive coating applying device, setting the adhesive during continued movement of the tube and carrier element, and removing the carrier element.

7. In a method of making a tubular covering, the steps comprising advancing a relatively non-extensible carrier element while drawing it from a supply thereof, applying the carrier element against a mandrel continuously with the advancement of the carrier element, wrapping a plurality of strands in parallel, contiguous spirals around said mandrel and carrier element during advancement of the latter to form a loosely integrated tube, drawing said tube away from the location where said strands are wrapped around said mandrel without disruption of the contiguous relationship of the spirals or stretching of the tube by continued movement of said carrier element, applying a flexible, stretchable adhesive coating to said tube and drying said adhesive during said forward movement.

PAUL F. McDERMOTT.
HARRY E. HOLCOMB.

REFERENCES CITED

The following references are of record in the file of this patent:

UNITED STATES PATENTS

| Number | Name | Date |
| --- | --- | --- |
| 477,593 | Greenfield | June 21, 1892 |
| 679,264 | Pedley | July 23, 1901 |
| 1,329,409 | Jacobs | Feb. 3, 1920 |
| 1,337,690 | Converse et al. | Apr. 20, 1920 |
| 1,396,789 | Short | Nov. 15, 1921 |
| 1,601,092 | Weigel | Sept. 28, 1926 |
| 1,604,273 | Gammeter | Oct. 26, 1926 |
| 1,610,954 | Lamplough | Dec. 14, 1926 |
| 1,974,285 | McClachlan | Sept. 18, 1934 |
| 1,990,248 | Parker | Feb. 5, 1935 |
| 2,234,353 | Quinlan | Mar. 11, 1941 |
| 2,247,197 | Graves | June 24, 1941 |
| 2,343,747 | Chernack | Mar. 7, 1944 |
| 2,354,556 | Stahl | July 25, 1944 |